United States Patent [19]
Hopkins et al.

[11] Patent Number: 5,498,910
[45] Date of Patent: Mar. 12, 1996

[54] BRAKE TURN SIGNAL ADAPTOR FOR TRAILERS

[75] Inventors: Evan L. Hopkins; Gregory A. Yotz, both of Emporia, Kans.

[73] Assignee: Hopkins Manufacturing Corporation, Emporia, Kans.

[21] Appl. No.: 310,649

[22] Filed: Sep. 22, 1994

Related U.S. Application Data

[60] Division of Ser. No. 909,127, Jul. 6, 1992, Pat. No. 5,389,823, which is a continuation-in-part of Ser. No. 579,151, Sep. 6, 1990, abandoned.

[51] Int. Cl.$^6$ .................................................. B60L 1/00
[52] U.S. Cl. ...................... 307/10.1; 340/686; 340/687; 307/10.8
[58] Field of Search ........................ 307/10.1, 10.8; 315/77; 340/431, 473, 475, 463, 464, 470, 686, 687, 475, 479

[56] References Cited

U.S. PATENT DOCUMENTS

| | | | |
|---|---|---|---|
| 3,144,561 | 8/1964 | Farrell | 250/217 |
| 5,030,938 | 7/1991 | Bondzeit | 340/431 |
| 5,165,666 | 11/1992 | Gerencser | 362/833 |
| 5,241,241 | 8/1993 | Eccleston | 315/82 |
| 5,384,823 | 2/1995 | Hopkins et al. | 307/10.1 |

Primary Examiner—Peter S. Wong
Assistant Examiner—Aditya Krishnan
Attorney, Agent, or Firm—Hovey, Williams, Timmons & Collins

[57] ABSTRACT

An electrical circuit for adapting the independent brake lights and turn signal lights on a towing vehicle to the combined brake and turn signal lights on an associated trailer. An isolation network and a first CMOS exclusive OR integrated circuit are connected between the right turn signal light connection and brake light connection of the towing vehicle and the combined right turn signal and brake light connection on the trailer. An isolation network and a second CMOS exclusive OR integrated circuit are similarly connected between the left turn signal light connection and brake light connection of the towing vehicle and the combined left turn signal and brake light connection on the trailer. The isolation network prevents feedback from the electrical lighting system of the trailer to the electrical lighting system of the towing vehicle.

33 Claims, 2 Drawing Sheets

5,498,910

BRAKE TURN SIGNAL ADAPTOR FOR TRAILERS

This application is a continuation of application Ser. No. 07/909,127, filed Jul. 6, 1992 now U.S. Pat. No. 5,389,823, which is a continuation in part of Ser. No. 07/579,151, filed on Sep. 6, 1990 now abandoned.

TECHNICAL FIELD

The present invention relates to a trailer light electrical circuit which adapts the independent turn signal and brake lights on a towing vehicle to the combined turn signal and brake lights on a trailer. Moreover, the invention specifically relates to using an isolation network between the electrical lighting system of the towing vehicle and the electrical lighting system of the trailer to prevent electrical feedback from the trailer to the towing vehicle.

BACKGROUND

The electrical lighting system of a towing vehicle typically includes brake and turn signal lights mounted on the rear of the vehicle for indicating vehicle braking or directional changes. Specifically, illuminated brake lights indicate a slowing or stopping vehicle, while illuminated and flashing turn signal lights indicate a turning vehicle. Typically in late model vehicles, the turn signal lights and brake lights are independently connected to the electrical lighting system of the towing vehicle and have separate filaments. The brake light filament is typically connected directly to the vehicle brake, while the turn signal light filament is typically connected directly to the turn signal indicator.

When the vehicle is used to tow a trailer, the lights on the vehicle are obscured, so it is necessary to include a separate set of brake and turn signal lights on the trailer. Each brake light and turn signal light on the trailer, however, is typically combined into a single light having a common filament. The single filament functions both as a turning indicator as well as a slowing or stopping indicator.

Consequently, in order for the trailer light to indicate the correct directional signal, it is necessary to adapt the independent turn signal and brake lights of the towing vehicle to the combined turn signal and brake lights of the trailer. Therefore, a trailer light adaptor circuit is typically inserted between the electrical lighting system of the towing vehicle and the electrical lighting system of the trailer to adapt the towing vehicle's lights to the trailer's lights. The adaptor circuit, for example, can be inserted between the trailer tap terminal on the towing vehicle and the wiring harness of the trailer, as shown in U.S. Pat. No. 4,842,524 issued to the assignee of the present invention.

Prior art devices have attempted to adapt the electrical lighting system of the towing vehicle to the trailer lights. For example, Bryant, U.S. Pat. No. 4,006,453 shows a device for adapting the independent brake and turn signal lights on a towing vehicle to the combined brake and turn signal lights on a trailer using two logic circuits, one circuit for each side. Bryant discloses logic circuits having npn transistors, silicon controlled rectifiers or relays connected between the electrical lighting system of the towing vehicle and the trailer lights.

Although Bryant discloses a circuit for adapting the electrical lighting system of a vehicle to the trailer lights, there remains a demand for new and improved electrical circuits which perform the same general function while providing manufacturing, operational and cost efficiencies.

In this regard, late model vehicles typically have on-board computers and sophisticated electronics to control the engine function and the electrical lighting system in the towing vehicle. The prior art electrical circuits may in some instances permit some feedback from the electrical lighting system of the trailer to the electrical lighting system of the towing vehicle.

SUMMARY OF THE INVENTION

The present invention relates to a new electrical circuit design to adapt the independent turn signal and brake lights on a towing vehicle to the combined turn signal and brake lights on a trailer. According to one aspect of the invention, the adaptor circuit includes complimentary metal oxide semiconductor (CMOS) exclusive OR integrated circuits (ICs) for providing logic functions in the circuit, and an isolation network comprising a series of LEDs and corresponding phototransistors for preventing feedback to the electrical lighting system of the towing vehicle. The adaptor circuit is inserted between the electrical lighting system of the towing vehicle and the electrical lighting system of the trailer.

In the isolation network, an LED and corresponding phototransistor are inserted between the brake light connection of the towing vehicle and one input to each of two exclusive OR ICs. The LED is adapted to be illuminated in response to current flowing to the brake lights in the towing vehicle. The phototransistor in turn is adapted to produce a logic signal to the exclusive OR ICs when the LED is activated. The phototransistor thereby provides a high input signal to one input of each exclusive OR IC when the brake light on the towing vehicle is activated. Similar LEDs and corresponding phototransistors are inserted between the tail light, backup light and right and left turn signal light connections on the towing vehicle, and their corresponding light connections on the trailer.

The exclusive OR ICs in the circuit provide for illuminating both the right and left combined brake and turn signal lights on the trailer when only the brake light on the towing vehicle is illuminated. Further, the CMOS exclusive OR ICs provide for inactivating the brake signal of the light on the side of the trailer for which the turn signal is operating. Thus, when the right-hand turn signal light is flashing and the brake light is on, only the left-hand combined turn signal and brake light of the trailer is continuously illuminated and the right-hand combined trailer light is blinking, and vice-versa.

The foregoing adaptor circuit provides for combining the independent turn signal and brake lights from the towing vehicle to the combined turn signal and brake lights of the trailer. Moreover, the circuit provides for isolating the electrical lighting system of the towing vehicle from the electrical lighting system of the trailer. The adaptor circuit further simplifies the electronic logic employed to provide manufacturing and cost efficiencies.

Other features and advantages of the present invention will become apparent from the following detailed description and accompanying drawings which form a part of the specification.

DETAILED DESCRIPTION OF THE PREFERRED EMBODIMENTS

Figure 1:
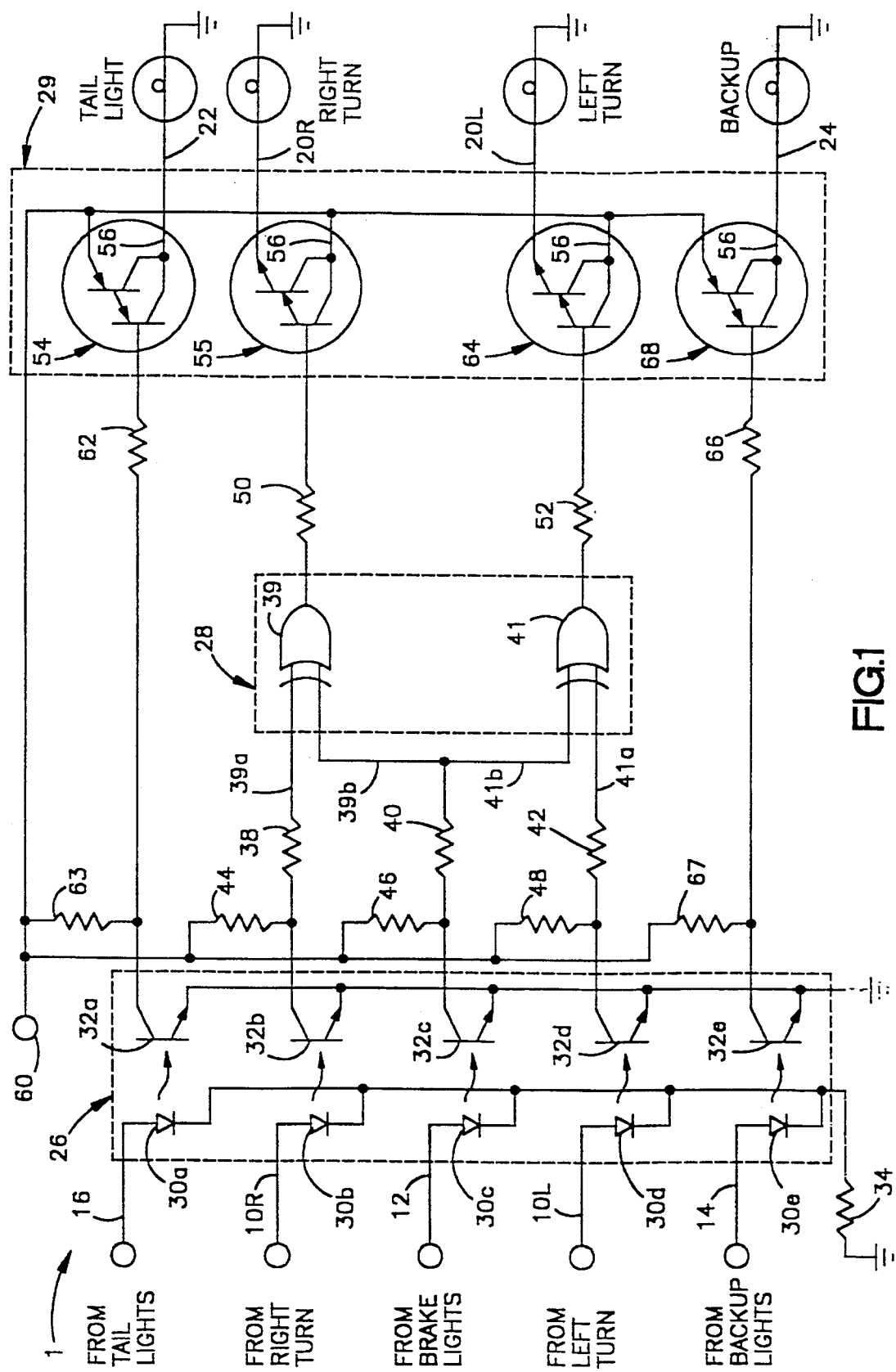
FIG. 1 is a schematic illustration of the electrical circuit constructed in accordance with the present invention.

Referring to the drawings, and initially to FIG. 1, the adaptor circuit, indicated generally at 1, provides for combining the independent turn signal lights and brake lights of a towing vehicle to the combined turn signal and brake lights of a trailer. Further, the adaptor circuit 1 provides for isolating the electrical lighting system of the towing vehicle from the electrical lighting system of the trailer with an isolation circuit, indicated generally at 26.

The towing vehicle includes right and left turn signal light connections 10R, 10L respectively, brake light connection 12, backup light connection 14 and tail light connection 16. The trailer includes combined brake and right and left turn signal light connections 20R and 20L, respectively, tail light connection 22, and backup light connection 24. The brake light connection 12 and the turn signal light connections 10R, 10L on the towing vehicle are electronically connected to the combined brake and turn signal light connections 20R, 20L on the trailer through an isolation network, indicated generally at 26, a logic network, indicated generally at 28, and an amplifier network, indicated generally at 29. The tail light connection 16 and backup light connection 14 on the towing vehicle are electronically connected to the tail light connection 22 and backup light connection 24 on the trailer through isolation network 26 and amplifier network 29.

In the preferred embodiment of the invention, the isolation network 26 comprises five LED's 30a–30e and five corresponding npn phototransistors 32a–32e. The LEDs and associated phototransistors cooperatively form optical couplers to isolate the electrical lighting system of the towing vehicle from the electrical lighting system of the trailer.

Specifically, a first optical coupler, comprising LED 30a and phototransistor 32a, is connected between the tail light connection 16 of the towing vehicle and the tail light connection 22 of the trailer. A second optical coupler, comprising LED 30e and phototransistor 32e, is connected between the backup light connection 14 on the towing vehicle and the backup light connection 24 on the trailer. A third optical coupler, comprising LED 30b and phototransistor 32b, is connected between the right turn signal light connection 10R, and the combined right turn signal and brake light connection 20R. Further, a fourth optical coupler, comprising LED 30c and phototransistor 32c, is connected between the brake light connection 12 on the towing vehicle and both the combined right and left turn signal and brake light connections 20R, 20L respectively on the trailer. Finally, a fifth optical coupler, comprising LED 30d and phototransistor 32d, is connected between the left turn light connection 10L on the towing vehicle and the combined left turn and brake light connection 20L on the trailer.

Each optical coupler is conventional in design, such as shown in the four gate package manufactured by Sharp, Model No. PC-817. The cathode of each LED 30a–30e of the isolation network 26 is connected through a current limiting resistor 34 (560 Ohms) to ground. Similarly, the emitter of each phototransistor 32a–32e is connected directly to ground.

Each optical coupler effectively isolates the electrical lighting system of the towing vehicle from the electrical lighting system of the trailer to prevent feedback from the trailer. Each LED of an optical coupler is responsive to current in its respective light connection. The current causes the LED to be illuminated, which in turn causes a corresponding phototransistor to become activated to produce a current flow from its collector. For example, if the right turn light is activated for flashing, current will intermittently flow through right turn light connection 10R and illuminate LED 30b. This illumination of LED 30b will optically activate photoresistor 32b across the gap therebetween to produce a current from the collector of phototransistor 32b. The LED-phototransistor pair precludes any feedback of electrical signals from the trailer to the towing vehicle.

The collectors of phototransistors 32b, 32c, 32d are connected to logic network 28 through resisters 38, 40 and 42, respectively. Resistors 38, 40 and 42, cooperate respectively with resistors 44, 46 and 48 to form three voltage dividers. Preferably resistors 38, 40 and 42 have a value of 22K Ohm, while resistors 44, 46 and 48 have a value of 470K Ohm. Resistors 44, 46 and 48 are connected to supply voltage 60, which is preferably a fuse protected, +12 VDC source.

The first voltage divider, comprising resistors 38 and 44, is connected between the collector of phototransistor 32b and a first input 39a to the logic network 28. Similarly, the second voltage divider, comprising resistors 42 and 48, is connected between the collector of phototransistor 32d and a second input 41a to the logic network 28. Finally, the third voltage divider, comprising resistors 40 and 46, is connected between the collector of phototransistor 32c and third and fourth inputs 39b, 41b respectively, to the logic network 28. The three voltage dividers are selected to provide the logic network 28 and the amplifier network 29 with the appropriate level of voltage to operate effectively.

The four inputs are connected to CMOS exclusive OR ICs 39, 41 in a prepackaged logic circuit. In particular, inputs 39a, 39b are connected to exclusive OR IC 39, while inputs 41a, 41b are connected to exclusive OR IC 41. The exclusive OR ICs 39, 41 are formed in CMOS transistors manufactured by a variety of companies under Model No. JIN 74C86. The exclusive OR ICs, however, can be formed or manufactured in a number of different ways, such as, for example in a programmable logic circuit. This invention is not limited in the technique for forming or manufacturing the exclusive OR ICs and all such different techniques are within the scope of this invention.

The exclusive or ICs perform the logic function for the right and left combined turn signal and brake lights on the trailer. For example, when either one of the two inputs to an exclusive OR IC is high, the output from the exclusive or IC is high. Further, when both of the two inputs are high (or both are low), the output is low.

The output from each exclusive OR IC 39, 41 in the logic network 28 is connected through resistors 50, 52 respectively (1K Ohm each) to the amplifier network 29. Similarly, the collector of phototransistor 32a from tail light connection 16 is connected through a fourth voltage divider, comprising resistor 62, (1K Ohm) and resistor 63 (4.7K Ohm), to the amplifier network 29. Resistor 63 of the fourth voltage divider is also connected to supply voltage 60. Further, the collector of phototransistor 32e from backup light connection 14 is connected through a fifth voltage divider, comprising resistor 66 (1K Ohm) and resistor 67 (4.7K Ohm), to the amplifier network 29. Resistor 67 of the fifth voltage divider is also connected to supply voltage 60. The fourth and fifth voltage dividers are selected to provide the amplifier network 29 with the appropriate level of voltage to operate effectively.

The amplifier network 29 preferably comprises four Darlington amplifiers 54, 55, 64, 68 which are selected to provide the proper output current levels to the filaments in the trailer lights. Each Darlington amplifier is conventional in design, and typically consists of two transistors. Darlington amplifiers 54 and 68 are manufactured by a variety of companies under Model No. TIP 120, while Darlington amplifiers 55, 64 are manufactured by a variety of companies under Model No. TIP 125. The four Darlington amplifiers are connected by output leads 56 to supply voltage 60.

The operation of the logic network 28 is as follows. When the right turn signal light on the towing vehicle is illuminated and the brake lights are inactive, current flows through right turn signal light connection 10R, and LED 30b is illuminated. Current thereby flows from the corresponding phototransistor 32b to the first voltage divider and produces a high input signal to input 39a of exclusive OR IC 39. The other input 39b to the exclusive OR IC 39, through the third voltage divider, is held low because the brake light is inactive. The exclusive OR IC 39 accordingly provides a high output pulse through resistor 50 to Darlington amplifier 55. The Darlington amplifier 55 in turn activates the right combined brake and turn signal light on the trailer through connection 20R. When the right turn signal light on the towing vehicle alternately flashes on and off, the right combined turn signal and brake light on the trailer also flashes on and off in synchronization.

When both the right turn signal light and the brake light on the towing vehicle are illuminated, a high input signal is received in both inputs 39a and 39b to exclusive OR IC 39 from the right turn signal light connection 10R and the brake light connection 12. Exclusive OR IC 39 accordingly provides a low output pulse through resistor 50 to Darlington amplifier 55. Consequently, the right combined turn signal and brake light on the trailer will be inactive. At the same time, a high input signal from the brake light on the towing vehicle is applied to the second input 41b of exclusive OR IC 41, while a low input signal is applied to the first input 41a from the inactive left turn signal light. The exclusive OR IC 41 accordingly provides a high output pulse to Darlington amplifier 64 to continuously illuminate the left combined turn signal and brake light of the trailer.

Further, when the right turn signal light on the towing vehicle turns off, the input to exclusive OR IC 39 from the right turn signal light connection 10R goes low, and the exclusive OR IC 39 accordingly provides a high output signal through resistor 50 to Darlington amplifier 55, and to the combined right turn signal and brake light. Accordingly, as the right turn signal light on the towing vehicle alternatingly flashes on and off, the combined right turn signal and brake light on the trailer alternatingly flashes off and on, in reverse synchronization with the turn signal light on the towing vehicle.

The left turn signal light and brake light on the towing vehicle operate in the same fashion as the right turn signal light and brake light through exclusive OR IC 41, and therefore their operation will not be described further. Finally, the tail lights and backup lights on the trailer operate independently of logic network 28, and hence are adapted to be illuminated when their corresponding lights on the towing vehicle are illuminated.

Figure 2:
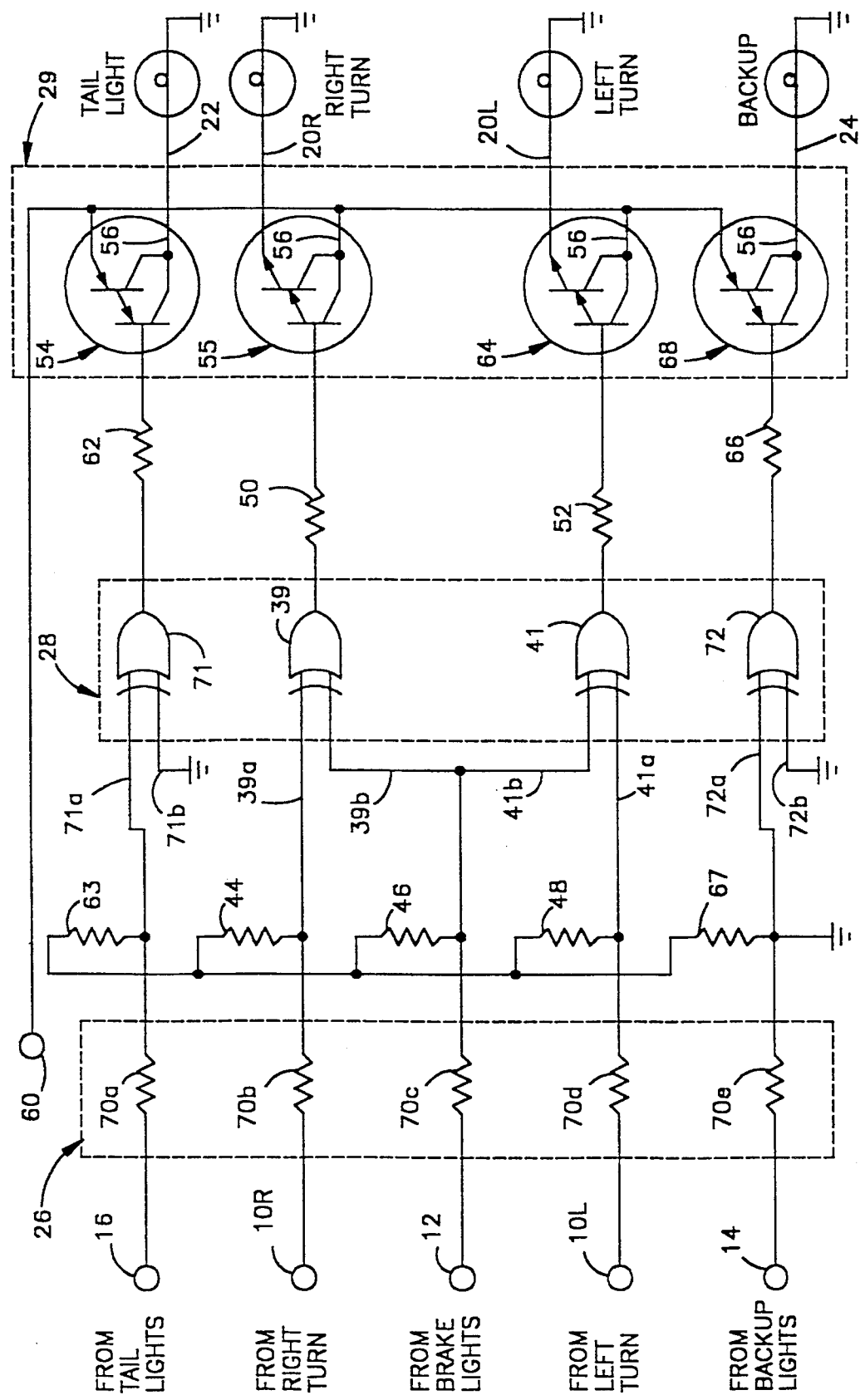
FIG. 2 is a schematic illustration of an additional embodiment of the electrical circuit of FIG. 1, having portions of the circuit omitted.

In an additional embodiment of the invention, as shown in FIG. 2, LED's 30a–30e and phototransistors 32a–30e in the isolation network can be replaced by a series of five high-impedance resistors 70a–70e. The high impedance resistors effectively shunt any feedback from the electrical system of the trailer to prevent the feedback from interfering with the electrical circuitry of the towing vehicle. Each of the high impedance resistors preferably has a value of at least 1M Ohm, and is connected between each electrical connection 16, 10R, 12, 10L, 14 in the towing vehicle and their corresponding electrical connections in the trailer. Additionally, resistors 44, 46, 48, 61 and 63 are each replaced with resistors having values of at least 1M Ohm, and are connected to ground.

In particular, high impedance resistor 70a is connected between tail light connection 16 on the towing vehicle and tail light connection 22 on the trailer. In the event the current through resistor 70a to tail light connection 22 is insufficient to drive the Darlington amplifier 54, lead 71a can be connected to a buffer 71, for example an unused exclusive OR IC in the logic circuit 28, to provide additional current to drive the Darlington amplifier 54. The other input 71b to the exclusive OR IC 71 can be connected to ground. Similarly, resistor 70e, connected between backup light connection 14 on the towing vehicle and backup light connection 24 on the trailer, can be connected through lead 72a to buffer 72, for example an additional unused exclusive OR IC in the logic circuit 28, to provide additional current to drive Darlington amplifier 68. Similarly, the other input 72b to the exclusive OR IC 72 can be connected to ground.

Consequently, the logic network 28, comprising exclusive OR ICs 39, 41, operates to combine the independent turn signal and brake lights from the towing vehicle to the combined turn signal and brake lights of the trailer. Further, the isolation network isolates the electrical circuitry of the towing vehicle from the electrical circuitry of the trailer to prevent feedback.

The principals, preferred embodiment and modes of operation of the present invention have been described in foregoing specification. The invention which is intended to protected herein should not, however, be construed as limited to the particular form described as it is to be regarded as illustrative rather than restrictive. Variations and changes may be made by those skilled in art without departing from the spirit of the present invention. Accordingly, the foregoing detailed description should be considered exemplary in nature and not as limiting to the scope and spirit of the invention set forth in the appended claims.

What is claimed is:

1. An electrical circuit for connecting the electrical lighting system of a towing vehicle to the electrical lighting system of a trailer, said circuit comprising:

receiving means for receiving electrical input pulses from the electrical lighting system of the towing vehicle;

an electrical isolation network including means for receiving said electrical input impulses and responding thereto for providing first and second isolated output pulses; and means for receiving said first and second output pulses and applying said first and second isolated output pulses to the electrical lighting system of the trailer to activate lights thereof, said isolation network including means for isolating the electrical lighting system brake light connections and turn light connections on the towing vehicle from the electrical lighting system of the trailer.

2. The circuit as set forth in claim 1, said isolation network including an optical coupler.

3. The circuit as set forth in claim 2, said optical coupler including an LED and a phototransistor.

4. The circuit as set forth in claim 1, said isolation network including high impedance means.

5. The circuit as set forth in claim 4, said high impedance including a resistor.

6. The circuit as set forth in claim 5, said resistor having a value of about 1.0 megohm.

7. The circuit as set forth in claim 6 including a plurality of said resistors.

8. The circuit as set forth in claim 4, said high impedance means including solid state devices.

9. The circuit as set forth in claim 8, said solid state devices including logic devices.

10. The circuit as set forth in claim 9, said logic devices including exclusive OR IC means.

11. The circuit as set forth in claim 10, said exclusive OR IC means being CMOS devices.

12. The circuit as set forth in claim 8, said solid state devices including a transistor.

13. The circuit as set forth in claim 12, said transistor being a bipolar transistor.

14. The circuit as set forth in claim 1, said circuit further including a plurality of transistors for turning on and off the trailer lights in response to receipt of said isolated output pulses.

15. The circuit as set forth in claim 14, said transistors including bipolar transistors.

16. The circuit as set forth in claim 14, said transistors being configured as a Darlington amplifier.

17. A vehicle-trailer adaptor for use with a towing vehicle and a trailer each having a rear light electrical system for activating the rear lights such as turn signal, brake, back-up and tail lights, said adaptor comprising:

circuit means, including means for receiving inputs indicative of the activation status of a plurality of the rear lights of the towing vehicle, for producing outputs in response to said inputs for activating the trailer rear lights in correspondence with said inputs; and means for electrically coupling said circuit means with the rear light electrical system of the trailer for providing said outputs thereto, said circuit means including isolation said inputs from said outputs thereby isolating means for electrically isolating the rear light electrical system of the trailer from the rear light electrical system of the vehicle.

18. The circuit as set forth in claim 17, said isolation means including an optical coupler.

19. The circuit as set forth in claim 18, said optical coupler including an LED and a phototransistor.

20. The circuit as set forth in claim 17, said isolation means including high impedance means.

21. The circuit as set forth in claim 20, said high impedance including a resistor.

22. The circuit as set forth in claim 21, said resistor having a value of about 1.0 megohm.

23. The circuit as set forth in claim 22 including a plurality of said resistors.

24. The circuit as set forth in claim 20, said high impedance means including solid state devices.

25. The circuit as set forth in claim 24, said solid state devices including logic devices.

26. The circuit as set forth in claim 25, said logic devices including exclusive OR IC means.

27. The circuit as set forth in claim 26, said exclusive OR IC means being CMOS devices.

28. The circuit as set forth in claim 24, said solid state devices including a transistor.

29. The circuit as set forth in claim 28, said transistor being a bipolar transistor.

30. The circuit as set forth in claim 17, said circuit further including a plurality of transistors for activating the trailer lights in response to receipt of said outputs.

31. The circuit as set forth in claim 30, said transistors including bipolar transistors.

32. The circuit as set forth in claim 31, said transistors being configured as a Darlington amplifier.

33. The circuit as set forth in claim 17, further including logic means for receiving inputs indicative of the activation of the brake lights and turn signal lights of the towing vehicle and responsive to said inputs for producing outputs for activating single filament lights of the trailer.

* * * * *